United States Patent [19]

Ivanov

[11] Patent Number: 5,743,471

[45] Date of Patent: *Apr. 28, 1998

[54] SOLID STATE SHEAR EXTRUSION PULVERIZATION

[75] Inventor: George Ivanov, Chicago, Ill.

[73] Assignee: Illinois Institute of Technology, Chicago, Ill.

[*] Notice: The portion of the term of this patent subsequent to Mar. 7, 2012, has been disclaimed.

[21] Appl. No.: 440,969

[22] Filed: May 15, 1995

Related U.S. Application Data

[63] Continuation-in-part of Ser. No. 101,468, Aug. 2, 1993, Pat. No. 5,415,354.

[51] Int. Cl.$^6$ .......................... B02C 23/00; B02C 23/28; B02C 19/22

[52] U.S. Cl. .................. 241/16; 241/17; 241/23; 241/65; 241/260.1; 366/85; 366/88; 366/89

[58] Field of Search .................. 241/16, 12, 23, 241/60, 65, 260.1, 261; 264/211.18, 211.23; 425/204, 208, 379.1; 366/83–85, 88, 89

[56] References Cited

U.S. PATENT DOCUMENTS

| | | |
|---|---|---|
| 3,102,716 | 9/1963 | Frenkel . |
| 3,104,420 | 9/1963 | Sellbach . |
| 3,164,375 | 1/1965 | Frenkel . |
| 3,525,124 | 8/1970 | Ocker . |
| 3,568,940 | 3/1971 | Merges . |
| 3,728,053 | 4/1973 | Stillhard et al. . |
| 3,814,566 | 6/1974 | Sharp . |
| 3,874,835 | 4/1975 | Rosater et al. . |
| 3,889,889 | 6/1975 | Sawa . |
| 4,041,115 | 8/1977 | Jenkins et al. . |
| 4,090,670 | 5/1978 | Bennett . |
| 4,098,463 | 7/1978 | Lowry . |
| 4,118,163 | 10/1978 | Lee . |

(List continued on next page.)

FOREIGN PATENT DOCUMENTS

| | | |
|---|---|---|
| 9114552 | 10/1991 | European Pat. Off. . |
| 567761 | 11/1993 | European Pat. Off. . |
| 2196242 | 3/1974 | France . |
| 3332629 | 3/1985 | Germany . |
| 4021550 | 1/1991 | Germany . |
| 4130315 | 1/1993 | Germany . |
| 334404 | 1/1959 | Switzerland . |
| 456937 | 7/1968 | Switzerland . |
| 1184717 | 3/1970 | United Kingdom . |
| 9521047 | 8/1995 | WIPO . |

OTHER PUBLICATIONS

Abstract of SU,A,1 213 612 (AS. USSR Chem. Phys. Inst. and Norplast Sci. Prodn. Assoc.); 15 Nov. 1993; Database, WPI, Sec. Ch, Week 9409, Derwent Publications Ltd., London, GB.

Japanese Patent Abstract, Pub. No. JP57034936, vol. 6, No. 101 (M–135), Pub. Date 25 Feb. 1982.

Japanese Patent Abstract, Pub. No. JP55159954, vol. 5, No. 23 (M–57), Pub. Date 12 Dec. 1980.

(List continued on next page.)

*Primary Examiner*—Frances Han
*Attorney, Agent, or Firm*—Speckman, Pauley & Fejer

[57] ABSTRACT

An apparatus for solid state shear extrusion pulverization of a polymeric material comprising an elongated hollow barrel having a feed zone, a heating zone adjacent to the feed zone, a powder formation zone adjacent to the heating zone, and a powder discharge zone adjacent to the powder formation zone. At least one screw is housed within the elongated hollow barrel. A hopper is provided for feeding the polymeric material into the feed zone of the elongated hollow barrel. Barrel heaters and coolers are provided for heating the polymeric material to a temperature less than its decomposition temperature in the heating zone and for maintaining the polymeric material below its melting point in the powder formation zone. The screw comprises a high shear screw section for applying normal and shear forces within the powder formation zone to form a powder of the solid state polymeric material.

17 Claims, 4 Drawing Sheets

U.S. PATENT DOCUMENTS

Japanese Patent Abstract, Pub. No. JP5331294, vol. 18, No. 163 (C-1181), Pub. Date 14 Dec. 1993.
Nikoli S. Enikolopian, "Some Aspects of Chemistry and Physics of Plastic Flow", Pure & Appl. Chem., vol. 57, No. 11, pp. 1707-1711, (1985).
Amer. Inst. Chem. Engrs; 1992 Annual Meeting, Nov. 1-6, 1992 Thermoplastic Waste Recycling Process Using Solid State Shear Extrus. Extended Abstracts, p. 441, Abstract No. 187e.

U.S. PATENT DOCUMENTS

| | | |
|---|---|---|
| 4,181,647 | 1/1980 | Beach . |
| 4,184,772 | 1/1980 | Meyer . |
| 4,367,190 | 1/1983 | Buch . |
| 4,408,888 | 10/1983 | Hanslik . |
| 4,511,091 | 4/1985 | Vasco . |
| 4,607,796 | 8/1986 | Enikolopov et al. . |
| 4,607,797 | 8/1986 | Enikolopow et al. . |
| 4,650,126 | 3/1987 | Feder et al. . |
| 4,708,617 | 11/1987 | Herrington . |
| 4,716,000 | 12/1987 | Kerschbaum et al. . |
| 4,875,847 | 10/1989 | Wenger et al. . |
| 4,890,996 | 1/1990 | Shimizu . |
| 4,968,463 | 11/1990 | Levasseur . |
| 4,997,131 | 3/1991 | Talonen . |
| 5,026,512 | 6/1991 | Chang . |
| 5,073,320 | 12/1991 | Stezel . |
| 5,088,914 | 2/1992 | Brambrlla . |
| 5,395,055 | 3/1995 | Shutov et al. ............ 241/16 |
| 5,397,065 | 3/1995 | Shutov et al. ............ 241/16 |
| 5,415,354 | 5/1995 | Shutov et al. ............ 241/16 |

SOLID STATE SHEAR EXTRUSION PULVERIZATION

CROSS-REFERENCE INFORMATION TO RELATED APPLICATION

This application is a continuation-in-part application of application Ser. No. 08/101,468, filed 02 Aug. 1993, now U.S. Pat. No. 5,415,354 issued 16 May 1995.

BACKGROUND OF THE INVENTION

1. Field of the Invention

This invention relates to a solid state shear extrusion process and apparatus for continuous pulverization to fine particles of a wide variety of solids and their mixtures, such as polymers, copolymers, homopolymers, agrowastes, rubber, wood chips, and mixtures of synthetic and natural polymers which have heretofore been resistant to such fine pulverization. The apparatus and process of this invention are especially useful for the recycling of synthetic and natural polymers and mixed polymer wastes using a non-cryogenic and low power consumption technique.

2. Description of Prior Art

Currently, there are three basic reclaiming processes of virgin and used plastics in wide use: chemical reclaiming processes, which include pyrolysis, hydrolysis, and incineration; thermal reclaiming processes, which, for example, include extrusion, injection molding, and pressure molding; and mechanical reclaiming processes, which include granulation, densification, agglomeration, and pulverization. However, these known processes generally have disadvantageous ranging from high energy consumption, a reduction in original properties of the polymers, applicability to only specific polymers, and environmental undesirability.

U.S. Pat. No. 4,090,670 teaches recovery of rubber from scrap vulcanized rubber tires by raising the surface temperature sufficiently to devulcanize the rubber tires followed by removal of the devulcanized material, such as by rasping. However, this method is limited to rubber and does not produce fine powders as desired for many reuse applications.

Reclamation of thermoplastic materials including shredding, grinding and comminuting is exemplified by U.S. Pat. No. 4,968,463 which teaches shredding waste plastic to about one hundred millimeters and grinding to under about 40 millimeters, followed by drying, pre-heating to 80° to 160° C., kneading at 120° to 250° C., and injection molding or extruding; U.S. Pat. No. 4,650,126 which teaches heating plastic particles to melt the surface to retain a grinding aid thereon and maintaining a counter-rotating attrition mill at a temperature to retain nearly all of the grinding aid in the softened polymer particles during grinding, followed by an air stream which serves to separate the grinding aid and as a material carrier medium; U.S. Pat. No. 4,511,091 which teaches thermoplastic scrap recovery combined with phonographic record pressing in which the hot trimmed waste is cooled, ground, and mixed with virgin material for formation of phonograph records; and U.S. Pat. No. 4,098,463 which teaches a liquid cooling spray to maintain the temperature in a cutting chamber such that the plastic is hard, which reduces the fibers embedded in the comminuted particles from plastic electrical or telephone cord insulation.

Various screw devices are known for conveyance and processing in the synthetic polymer industry. Molding of products from a mixture of thermoplastic polymers or a thermoplastic polymer and an inorganic material by control of crystallization in a screw extruder with temperature control in a first portion within 35° C. below the material melting point and the temperature in a second portion within 35° C. above the material melting point, with the maximum temperature at the outlet, is taught by U.S. Pat. No. 5,026,512. U.S. Pat. No. 4,890,996 teaches continuous granulating by melting, kneading and granulating macromolecules wherein a double screw kneader without lateral communication is capable of adjusting the degree to which material is kneaded by axial adjustment of the cylinders and screws with respect to each other.

Conical screw sections are known to be used for specific purposes. A twin screw extruder, especially suited for viscous material, having frusto-conical screw sections and separate barrel sections at the outlet end providing bearing-type support for the separate screws is taught by U.S. Pat. No. 4,875,847. U.S. Pat. No. 3,525,124 teaches an extracting apparatus having screw-threaded shafts rotatable within a housing and having conveying and milling sections within an obstruction section between for pressure sealing. The screw in the housing may be tapered to form the obstruction section, thereby providing independent heat and pressure control in the conveying and milling sections.

Chemical and physical aspects of transformation of polymeric materials, such as pulverization, under simultaneous high pressure and shear is described in Nikolai S. Enikolopian, "Some Aspects of Chemistry and Physics of Plastic Flow", *Pure and Applied Chemistry*, Vol. 57, No. 11, pp. 1707–1711, (1985).

U.S. Pat. No. 4,607,797 teaches pulverization of used polymers in an extrusion apparatus having a barrel with at least one cylindrical rotatable screw. When two screws are used, they are co-rotational. In accordance with the teachings of this patent, material is fed to one end of the barrel, heated to above its fusing (melting) temperature in a first zone, and cooled to below its solidification temperature with simultaneous pre-crushing and pulverizing of the solidified material in a second zone to form a powdered material which is discharged from the opposite end of the barrel. Screw action is used to convey the material through the barrel and substantially elliptical or triangular kneading or pulverizing disks non-rotatably mounted on the screw in the cooling zone perform the pre-crushing and pulverizing. The process is carried out at 0.25 to 0.30 MPa. This process is said to continuously produce particles having a very uniform grain size, for example, in the case of polyethylene, only 2% larger than 160 microns.

U.S. Pat. No. 4,607,796 teaches pulverization of rubber and vulcanization products in a standard single-or-multiple screw extruder by compressing the material to be pulverized at a pressure of 0.2 to 0.7 MPa and then subjecting the compressed material to a shear force of 0.03 to 5 N/mm$^2$ at a pressure of 0.2 to 50 MPa and a temperature of 80° to 250° C., forming hot sheared material which is subjected to a shearing force of 0.03 to 5 N/mm$^2$ at a pressure of 0.2 to 50 MPa and a temperature of 15° to 60° C., forming cooled powdered material. Addition of granulated polyethylene to butyl rubbers is necessary to obtain finely dispersed powders. This process is said to result in particles not exceeding 500 micrometers in the case of natural rubber and 300 micrometers with other rubbers.

SUMMARY OF THE INVENTION

Natural and synthetic polymer wastes are increasing and environmental concerns regarding their disposition make recycling a necessity. However, many reclamation processes to date have been limited to certain types of wastes and particularly limited with respect to mixed wastes, have been uneconomical, particularly with respect to energy consumption, and have not provided reclaimed material in a form suitable for reuse in manufacturing. Solid state shear extrusion pulverization according to this invention requires low energy input, about one-fifth the energy required in presently used cryogenic pulverization, and provides finer and more uniform powders than pulverization techniques presently known to me, which may be used in a broader range of reuse or end use manufacture.

Accordingly, it is one object of this invention to provide a low energy consumption process and apparatus for pulverization of polymeric materials to fine powders.

It is another object of this invention to provide a process and apparatus for pulverization of a wide variety of natural and synthetical polymeric materials to form a fine powder.

It is yet another object of this invention to provide a process and apparatus suitable for economical recycling of a wide variety of natural and synthetic polymer wastes, including mixed wastes, by solid state shear extrusion pulverization of such wastes materials, forming fine powders suitable for use in new product production.

It is yet another object of this invention to provide fine polymeric particles for coating and preservation of stone and concretes, such as used in monuments, buildings, and bridges, and concrete pipes and materials exposed to corrosive environments. The object is to provide a substitute for liquid paint and coatings based upon organic, non-environmentally friendly solvents with fine particle coatings which are more durable, stable and environmentally safe when applied to surfaces, in particular metal and porous mineral surfaces.

It is still another object of this invention to provide a process and apparatus which enhances reactivity of polymeric and solid monomeric materials in the formation of homopolymers, copolymers and polymeric materials not achievable by prior methods of reaction.

It is an object of this invention to provide an apparatus for solid state shear extrusion pulverization suitable for use in formulating fine powder from one or a plurality of polymeric materials.

It is another object of this invention to provide an apparatus for solid state shear extrusion pulverization of one or a plurality of polymeric materials by which particle size of the fine powders produced therein are readily adjustable.

In a previous U.S. patent application having Ser. No. 08/101,468, fluidization of the fine powder produced by solid state shear extrusion pulverization with a gas stream is used to prevent agglomeration of the fine powder particles prior to discharge from the extrusion apparatus. The agglomeration of the fine powder particles results from softening of the fine powder particles due to temperatures at the discharge end of the extrusion apparatus near the softening or melting temperature of said particles and pressures similar to pressures encountered in compaction and sintering processes. Fluidization of the fine powder particles requires the use of additional equipment to fluidize the particles and prevent their discharge into the atmosphere. It is an object of this invention to provide an apparatus for solid state shear extrusion pulverization of one or more polymeric materials in which agglomeration of the fine powder particles due to temperatures and pressures in the discharge end is prevented without the use of additional equipment required for fluidization.

Prior solid state shear extrusion pulverization machines have required four zones for processing of the polymeric material—a feed zone, a heating zone, a cooling/pulverization zone, and a cooling/non-agglomeration zone. In order to accommodate the requirements of four zones, such machines are of necessity relatively long. Accordingly, it is yet another object of this invention to provide an apparatus for solid state shear extrusion pulverization of one or more polymeric materials in which the length of the barrel in which the extrusion is carried out is substantially less than the length of the barrel of known extruders.

These and other objects of this invention are achieved by an apparatus for solid state shear extrusion pulverization of polymeric materials comprising an elongated hollow barrel having a feed zone, a heating zone adjacent to the feed zone, a powder formation zone adjacent to the heating zone and a powder discharge zone adjacent to the powder formation zone. Housed within the elongated hollow barrel is at least one screw comprising a high shear screw section. The apparatus further comprises feed means for feeding the polymeric material to the feed zone, temperature adjustment means for heating the polymeric material to a temperature less than the decomposition temperature of the polymeric material in the heating zone and for maintaining the polymeric material below its melting point in the powder formation zone, and high shear friction means for creating normal and shear forces sufficient to form a powder of the polymeric material in the powder forming zone. The heat applied to the polymeric materials in the heating zone decreases the physical bonds between macromolecules and decreases mechanical toughness. Suitable forces are applied by screw rotation, preferably from about 2 to about 250 rpm, although higher rotation speeds may be employed. In order to produce the fine powders, it is critical that the temperature of the polymeric material in the powder formation zone be maintained above its phase transition temperature but below its melting point. To inhibit the agglomeration of the fine powder particles produced in the powder formation zone, it is preferred that the temperature within the powder formation zone be as low as possible, but above the glass transition temperature of the polymeric material, thereby rendering the material easier to shear while still inhibiting the formation of agglomerates.

The apparatus of this invention is applicable to a variety of polymers, such as, high and low density polyethylene, rubber, mixtures of high and low density polyethylene and rubber, and high and low density polyethylene and wood, copolymers, phenolic resins and thermoset polyurethane. The fine polymeric material produced by the apparatus of this invention enables much broader end uses as fillers and reinforcement agents in matrices, such as polymer, ceramic, gypsum, concrete, and asphalt. This is important to practical utilization of products of recycling polymer wastes, both pre- and/or post-consumer, to reduce the environmental problems caused by such solid wastes.

BRIEF DESCRIPTION OF THE DRAWINGS

These and other objects and features of this invention will be better understood and more apparent from the following detailed description taken in conjunction with the drawings wherein.

DESCRIPTION OF PREFERRED EMBODIMENTS

In the process of solid state shear extrusion pulverization according to this invention, polymeric granules, flakes or shreds of virgin or used synthetic or natural polymer, copolymer and homopolymer materials, or a mixture of such materials, are fed by suitable feed means to a first zone at a feed end of a hollow cylindrical or generally converging barrel housing a single or twin screw extruder having a heating zone in which the polymeric materials are heated to a temperature less than their decomposition temperature and a high shear (friction) zone disposed downstream of said heating zone in which said polymeric materials are pulverized. The temperature of the high shear zone is maintained below the melting point of the polymeric materials being pulverized, thereby insuring that the polymeric materials are in a "solid state".

Figure 1:
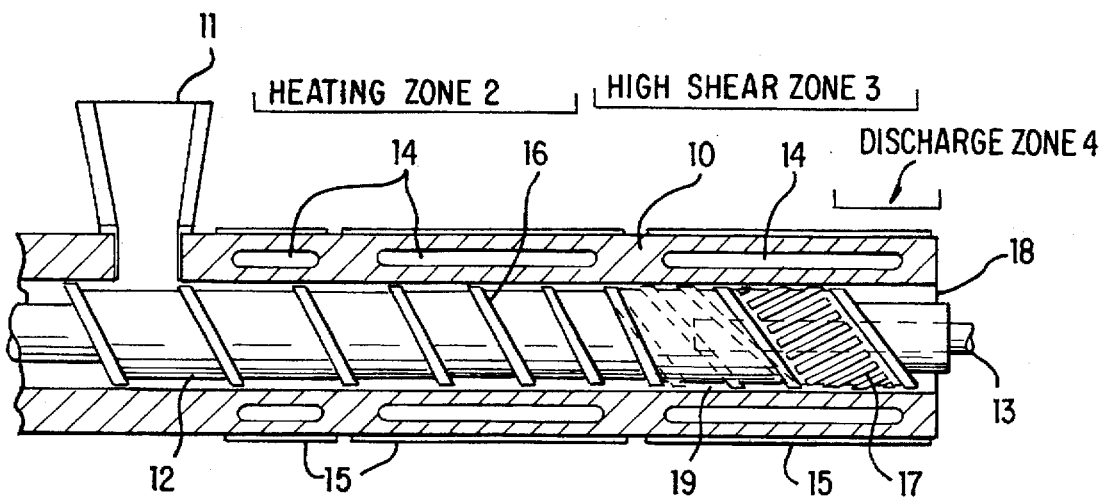
FIG. 1 is a longitudinal cross-sectional view of a barrel of a solid state shear extrusion pulverization apparatus with a single cylindrical screw in accordance with one embodiment of this invention.
Figure 2:
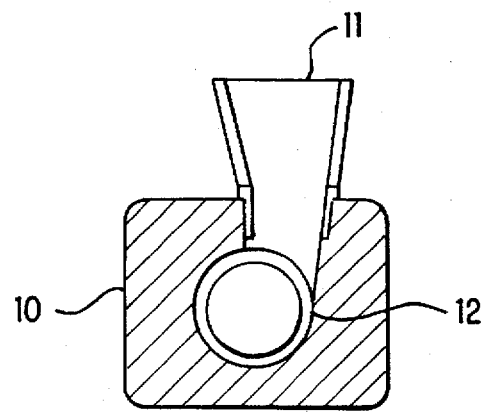
FIG. 2 is an end view of the apparatus shown in FIG. 1.

FIG. 1 is a longitudinal sectional view of an apparatus in accordance with one embodiment of this invention comprising feed hopper 11 for feeding polymeric materials to feed zone 1 within cylindrical barrel 10 housing cylindrical screw 12. Heaters 15 are provided in the barrel walls in the region of heating zone 2 and high shear zone 3. Barrel cooling conduits 14 are provided in the barrel walls in the heating zone 2 and high shear zone 3 for controlling the temperature within those regions of barrel 10. Spacing of the flights 16 on cylindrical screw 12 is set to provide a constant mass flow rate of material from feed zone 1 through the powder formation high shear zone 3. Thus, as shown in FIG. 1, the distance between flights 16 or the channel depths in heating zone 2 is generally less than the distance between flights 16 or channel depths in feed zone 1. In addition, there is shown a significant decrease in the distance between flights or the channel depths of cylindrical screw 12 resulting in formation of high shear zone 3. Also shown is a substantial increase in the gap between barrel 10 and screw 12 in the area of discharge zone 4 by which formation of agglomerates in discharge zone 4 is inhibited. FIG. 2 shows an end view of the single screw apparatus shown in FIG. 1.

In accordance with one preferred embodiment of this invention, to promote the pulverization of materials within high shear zone 3, the surface 17 of screw 12 in high shear zone 3 is roughened. Alternatively, the interior surface of barrel 10 in the high shear zone 3 may be roughened to promote pulverization.

Figure 3:
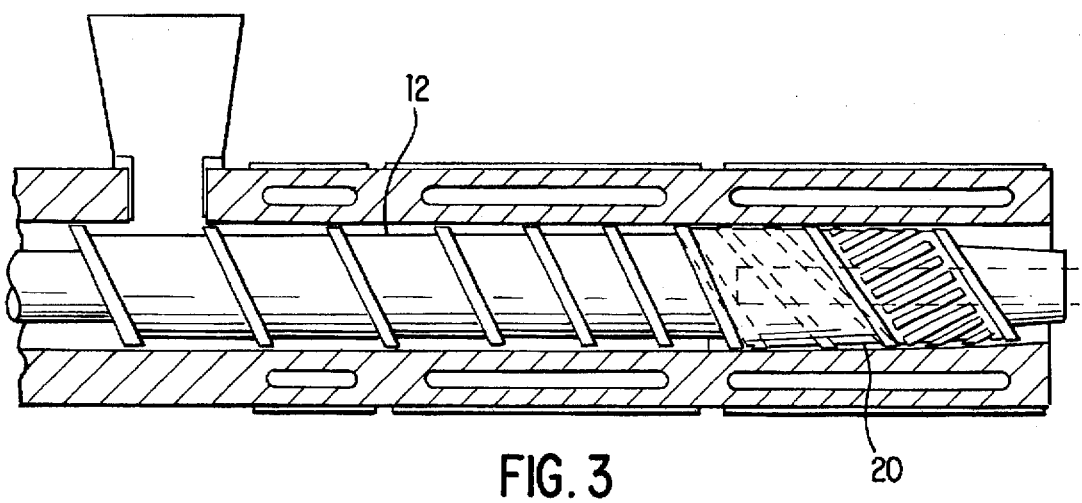
FIG. 3 is a longitudinal cross-sectional view of a barrel of a solid state shear extrusion pulverization apparatus with twin cylindrical screws with parabolic screw sections in accordance with one embodiment of this invention.
Figure 4:
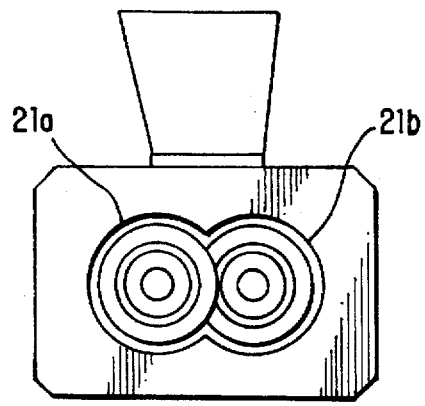
FIG. 4 is an end view of the apparatus shown in FIG. 3.
Figure 5:
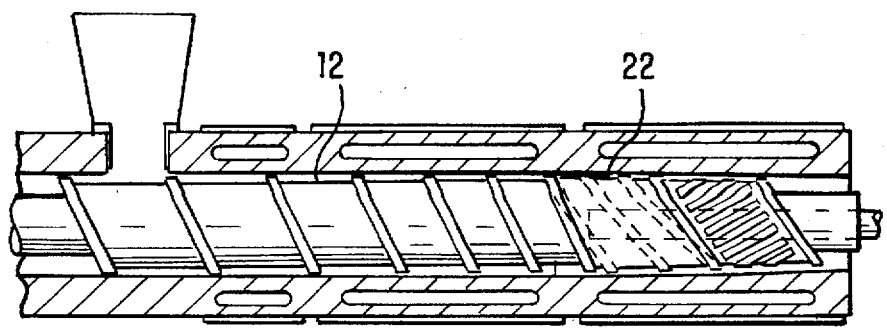
FIG. 5 is a longitudinal sectional view of a barrel of a solid state shear extrusion pulverization apparatus with a single cylindrical screw having a conical screw section in accordance with one embodiment of this invention.

FIG. 3 is a longitudinal sectional view of a two screw apparatus according to one embodiment of this invention comprising twin screws 21a and 21b as shown in FIG. 4. Screw 12 is cylindrical through heating zone 2. High shear zone 3 in accordance with the embodiment shown in FIG. 3 comprises parabolic screw section 20. In accordance with yet another embodiment as shown in FIG. 5, high shear zone 3 comprises conical screw section 22.

Figure 6:
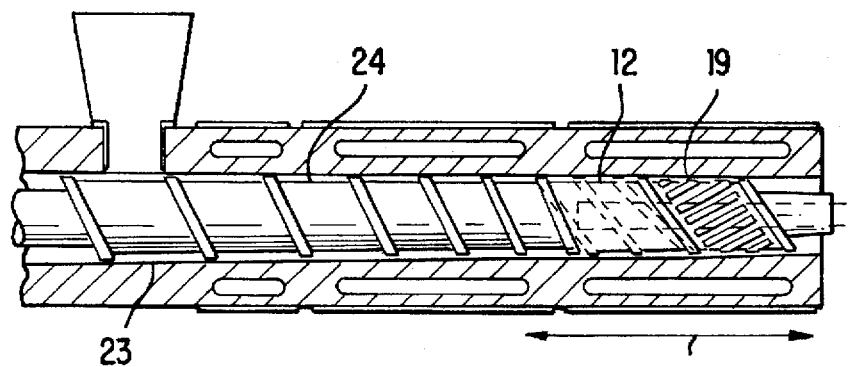
FIG. 6 is a longitudinal sectional view of a barrel of a solid state shear extrusion pulverization apparatus with a single conical screw in accordance with one embodiment of this invention.

In accordance with yet another embodiment of this invention as shown in FIG. 6, screw 24 and barrel 23 are generally converging. By "generally converging," I mean that the cross-sections of the feed end of barrel 23 and the screw 24 are larger than the opposite discharge ends and, in high shear zone 3, the convergence is continuous, forming conical screws in at least that zone. Using a generally converging barrel 23 as shown in FIG. 6, the size of particles formed within high shear zone 3 can be adjusted by shifting the position of barrel 10 and, thus, the screw section disposed within high shear zone 3 as indicated by arrow 25, thereby varying the size of gap 19. Such adjustments are also possible in accordance with the embodiments shown in FIGS. 1, 5, 7 and 8.

Figure 7:
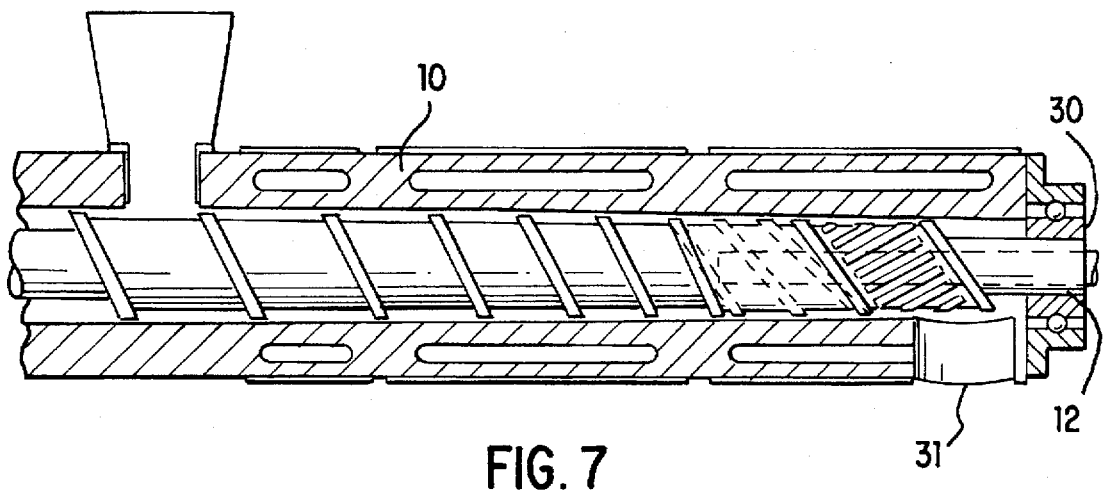
FIG. 7 is a view of a barrel of a solid state shear extrusion pulverization apparatus with a single conical screw and a powder discharging port on the bottom side of the barrel in accordance with one embodiment of this invention.

In accordance with one preferred embodiment of this invention as shown in FIG. 7, barrel 10 forms a bottom discharge 31 through which powder formed in the high shear zone is discharged. The discharge end of barrel 10 is closed off by bearing 30 into which the end of screw 12 is fitted, thereby facilitating the rotation of screw 12 within barrel 10 and reducing the potential for wobble of screw 12, particularly in the high shear zone.

Figure 8:
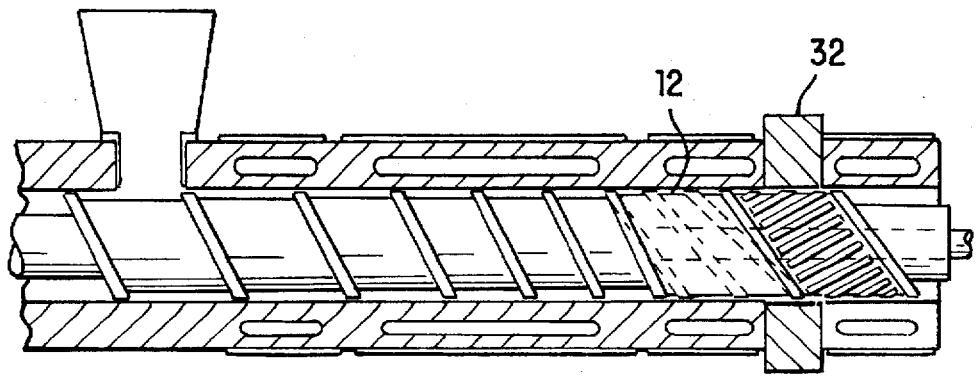
FIG. 8 is a longitudinal sectional view of a barrel of a solid state shear extrusion pulverization apparatus having a rotated segment and a single cylindrical screw in accordance with one embodiment of this invention.
Figure 9:
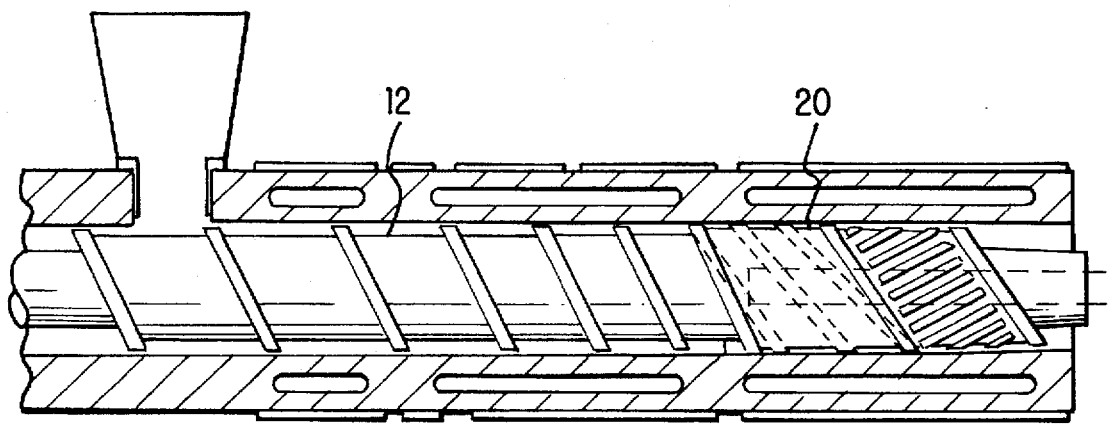
FIG. 9 is a longitudinal sectional view of a barrel of a solid state shear extrusion pulverization apparatus with a single cylindrical screw having a parabolic screw section in accordance with one embodiment of this invention.

In accordance with yet another embodiment of this invention as shown in FIG. 8, barrel 10 comprises in independently rotatable barrel section 32 disposed within the high shear zone. Rotated barrel segment 32 is employed to create additional shear. The direction of rotation may be in the same direction as the direction of rotation of screw 12, albeit at a different velocity therefrom, or alternatively, the direction of rotation of rotated barrel segment 32 may be in the direction opposite to the direction of rotation of screw 12.

Important to obtaining the best performance of my invention is the maintenance of the temperature in the powder formation zone as high as possible above the phase transition temperature, while still maintaining it below the fusion point, of the material being processed. As a result, the polymeric material is easier to shear, requiring less energy to turn the screw and pulverize the polymeric material. In order to prevent agglomeration of the powder at the end of the powder formation zone due to temperature and pressure, it is preferred that screw 12 be cooled. Although it is known to cool screws from the back end (feed end) of the screw, cooling of the screw in the powder formation zone in this fashion is not applicable because the coolant must first pass through the heating zone where the set temperature is higher than in the powder formation zone to get to the powder formation zone where the set temperature is less than in the heating zone. For internal cooling of screw 12 of the apparatus of this invention, screw 12 comprises shear screw cooling means. In accordance with another embodiment, shear screw 12 forms an axial bore in the discharge section of shear screw 12, the axial bore extending at least through the high shear section of the apparatus. Inserted into the axial bore is said shear screw cooling means, for example, screw cooling conduit 13 comprising two concentrically disposed conduits into which a coolant can be introduced from the discharge end of shear screw 12, flow into the interior of shear screw 12 where it conducts heat away from the interior of shear screw 12 and discharged from the discharge end of shear screw 12. In accordance with one preferred embodiment of this invention, the coolant is ethylene glycol, all though it will be apparent to those skilled in the art that there are other cooling fluids suitable for use in this apparatus. An extension of the screw end out of barrel 10 can provide additional screw cooling.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. An apparatus for solid state shear extrusion of a polymeric material comprising:
   an elongated hollow barrel having a feed zone, a heating zone adjacent said feed zone, a powder formation zone adjacent said heating zone, and a powder discharge zone adjacent said powder formation zone;
   at least one screw housed within said elongated hollow barrel;
   feed means for feeding said polymeric material to said feed zone;
   temperature adjustment means for heating said polymeric material to a temperature less than its decomposition temperature in said heating zone and for maintaining said polymeric material above its phase transition temperature and below its melting point in said powder formation zone; and
   high shear friction means for applying normal and shear forces sufficient to form a powder in said powder forming zone.

2. An apparatus in accordance with claim 1, wherein said at least one screw comprises a feed/softening section concurrent with said feed zone and said heating zone, a high shear screw section concurrent with said powder formation zone, and a discharge section concurrent with said powder discharge zone.

3. An apparatus in accordance with claim 2, wherein said feed/softening section comprises not more than about 80% of the length of said screw, said high shear screw section comprises between about 3% and about 40% of the length of said screw, and said discharge section comprises between about 1% and about 30% of the length of said screw.

4. An apparatus in accordance with claim 3, wherein at least one of the distance between flights of said screw and the channel depths of said screw is smaller in said powder forming zone than in said feed/softening zone and the distances between the flights of said screw and the channel depths of said screw are set so as to maintain a constant feed rate of said polymeric material through said elongated hollow barrel.

5. An apparatus in accordance with claim 4, wherein said elongated hollow barrel is cylindrical.

6. An apparatus in accordance with claim 5, wherein said high shear friction means comprises said high shear screw section having one of a parabolic, a conical and a cylindrical longitudinal cross-section.

7. An apparatus in accordance with claim 6, wherein said elongated hollow barrel has one of a cylindrical, parabolic and a conical longitudinal cross-section through said powder forming zone, the larger end of said conical and parabolic longitudinal cross-sections being disposed in the direction of said feed/softening zone.

8. An apparatus in accordance with claim 7, wherein said elongated hollow barrel is one of conical and parabolic through said powder formation zone and said elongated hollow barrel is movable in an axial direction with respect to said screw whereby the gap between said high shear screw section and the interior wall of said elongated hollow barrel is variable through said powder formation zone, thereby enabling adjustment of the particle size of the powder formed in said powder formation zone.

9. An apparatus in accordance with claim 6, wherein the surfaces of said screw in said high shear screw section are roughened.

10. An apparatus in accordance with claim 1, wherein said temperature adjustment means comprises heating means for heating said feed/softening zone and cooling means for cooling said powder formation zone and said discharge zone.

11. An apparatus in accordance with claim 10, wherein said cooling means comprises screw cooling means for cooling said screw.

12. An apparatus in accordance with claim 11, wherein said screw forms an axial bore in said discharge section, said axial bore extending at least through said high shear section, and said screw cooling means is inserted into said axial bore.

13. An apparatus in accordance with claim 1 further comprising fluidization means for fluidizing said powder discharged from said powder discharge zone.

14. An apparatus in accordance with claim 1 comprising two meshing screws, each said screw comprising a high shear screw section.

15. An apparatus in accordance with claim 1, wherein said discharge end of said elongated hollow barrel is closed off and said elongated hollow barrel forms an opening in said powder discharge zone in a bottom region of said elongated hollow barrel, said opening enabling discharge of said powder.

16. An apparatus in accordance with claim 15, wherein said discharge end is closed off by a bearing into which the discharge end of said screw is rotatably inserted.

17. An apparatus in accordance with claim 1, wherein said hollow elongated barrel comprises a rotatable segment disposed within said powder forming zone.

* * * * *